United States Patent
Min et al.

(10) Patent No.: US 9,507,403 B2
(45) Date of Patent: Nov. 29, 2016

(54) POWER MANAGEMENT USING REWARD-BASED SLEEP STATE SELECTION

(75) Inventors: Alexander W. Min, Portland, OR (US);
Ren Wang, Portland, OR (US);
Jr-Shian Tsai, Portland, OR (US);
Mesut A. Ergin, Portland, OR (US);
Tsung-Yuan C. Tai, Portland, OR (US);
Rajith K. Mavila, Bangalore (IN);
Prakash N. Iyer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 184 days.

(21) Appl. No.: 13/996,086

(22) PCT Filed: Dec. 27, 2011

(86) PCT No.: PCT/US2011/067377
§ 371 (c)(1),
(2), (4) Date: Jun. 12, 2014

(87) PCT Pub. No.: WO2013/100901
PCT Pub. Date: Jul. 4, 2013

(65) Prior Publication Data
US 2014/0289546 A1    Sep. 25, 2014

(51) Int. Cl.
*G06F 1/00*   (2006.01)
*G06F 1/26*   (2006.01)
*G06F 1/32*   (2006.01)

(52) U.S. Cl.
CPC .................................. *G06F 1/3228* (2013.01)

(58) Field of Classification Search
CPC .................................................. G06F 1/3228
USPC ........................................................ 713/323
See application file for complete search history.

(56) References Cited

U.S. PATENT DOCUMENTS

| | | | |
|---|---|---|---|
| 5,666,537 A | 9/1997 | Debnath et al. | |
| 2007/0266385 A1 | 11/2007 | Flautner et al. | |
| 2008/0137800 A1 | 6/2008 | Ohba et al. | |
| 2010/0169683 A1* | 7/2010 | Wang | G06F 1/3203 713/323 |
| 2010/0313048 A1 | 12/2010 | Shye et al. | |
| 2011/0040995 A1* | 2/2011 | Basak | G06F 1/3203 713/324 |

(Continued)

FOREIGN PATENT DOCUMENTS

| | | |
|---|---|---|
| CN | 101916137 A | 12/2010 |
| TW | 200732905 A | 9/2007 |
| WO | 2013/100901 A1 | 7/2013 |

OTHER PUBLICATIONS

International Preliminary Report on Patentability and Written Opinion received for PCT Patent Application No. PCT/US2011/067377 mailed on Jul. 10, 2014, 6 Pages.

(Continued)

*Primary Examiner* — Robert Cassity
(74) *Attorney, Agent, or Firm* — Jordan IP Law, LLC (57) ABSTRACT

Systems and methods may provide for conducting a reward determination for a plurality of sleep states to obtain a plurality of reward determinations with respect to a device. In addition, a sleep state may be selected for the device from the plurality of sleep states based at least in part on the plurality of reward determinations. In one example, false entry and missed opportunity probabilities may be determined for stochastic interrupts, wherein the reward determination is conducted based at least in part on the false entry and missed opportunity probabilities.

27 Claims, 4 Drawing Sheets

(56) References Cited

U.S. PATENT DOCUMENTS

2011/0154080 A1 6/2011 Wang et al.
2011/0173474 A1* 7/2011 Salsbery ............... G06F 1/206
 713/323

OTHER PUBLICATIONS

International Search Report and Written Opinion received for PCT Application No. PCT/US2011/067377, mailed on Sep. 24, 2012, 9 pages.

Chung et al., "Dynamic Power Management Using Adaptive Learning Tree", Computer-Aided Design, Nov. 1999, pp. 274-279.
Diao et al., "Prediction of CPU Idle-Busy Activity Pattern", High Performance Computer Architecture, Feb. 16-20, 2008, pp. 27-36.
Wang et al., "Reducing Power Consumption for Mobile Platforms Via Adaptive Traffic Coalescing", IEEE Journal on Selected Areas in Communications, vol. 29, No. 8, Sep. 2011, pp. 1618-1629.
European Search Report for EP Patent Application No. 11879032.8, mailed Jul. 14, 2015, 7 pages.

* cited by examiner

POWER MANAGEMENT USING REWARD-BASED SLEEP STATE SELECTION

BACKGROUND

Technical Field

Embodiments generally relate to power management in computing platforms. More particularly, embodiments relate to the use of reward-based metrics to select sleep states for computing platforms.

Discussion

In conventional mobile computing platforms, sleep states may be used to reduce power consumption and extend battery life. The determination of whether to enter a given sleep state may be limited to making a prediction as to whether a known timer interrupt will occur prior to the energy break even time of the sleep state, wherein the prediction can be corrected based on the historical success of past predictions. Such an approach may have a negative impact on energy efficiency and performance in certain circumstances.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Reducing platform power consumption to extend battery life can be particularly advantageous for small form factor platforms with active workloads, such as smartphones and tablets. A number of processors and/or platforms may provide multiple low power sleep states (e.g., Cx, S0ix), wherein deeper sleep states can typically consume less power but may require more time to enter and exit the sleep states. Ensuring efficient use of sleep states may therefore be a key to power management, particularly in platforms having a wide variety of interrupts that can cause sleep state exits. As will be discussed in greater detail, an enhanced approach to sleep state selection may involve taking into account the probability of making sub-optimal decisions and their associated overhead (e.g., reward based sleep state selection), as well as distinguishing between the deterministic and stochastic nature of system interrupts that can impact the effectiveness of sleep state selections. In particular, the following discussion first addresses the deterministic/stochastic distinction, and then discusses reward based sleep state selections.

Figure 1:
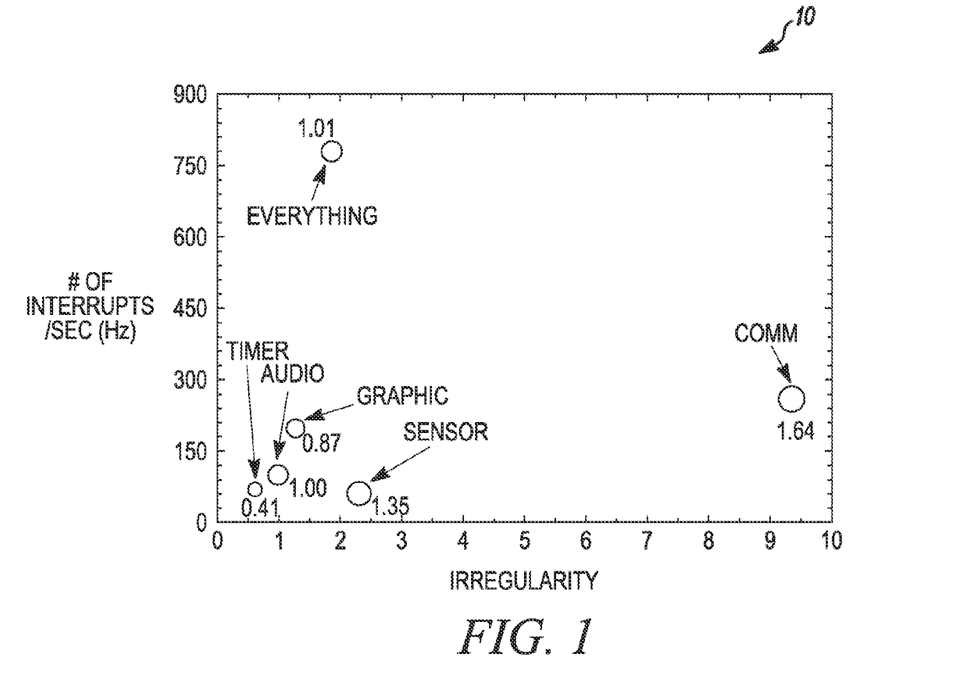
FIG. 1 is a plot of an example of irregularity versus frequency for various types of interrupts according to an embodiment.

Turning now to FIG. 1, a plot 10 shows the irregularity and prediction error (indicated by the size the circles) of various types of interrupts in a typical mobile platform streaming video versus the frequency (number of interrupts per second) of the interrupts. In general, the plot 10 demonstrates that certain types of interrupts may be considered deterministic, whereas other types of interrupts may be considered stochastic. In the example shown, timer (e.g., operating system/OS programmed future events) interrupts occur with the most regularity, are relatively infrequent, and have the lowest prediction error (i.e., 0.41). Thus, such interrupts may be considered deterministic. Communications (e.g., network packet related) interrupts, on the other hand, may occur with the least regularity, be more frequent, and have the highest prediction error (i.e., 1.64) when a simple moving average estimator is used—accordingly, these types of interrupts may be considered stochastic.

Figure 2:
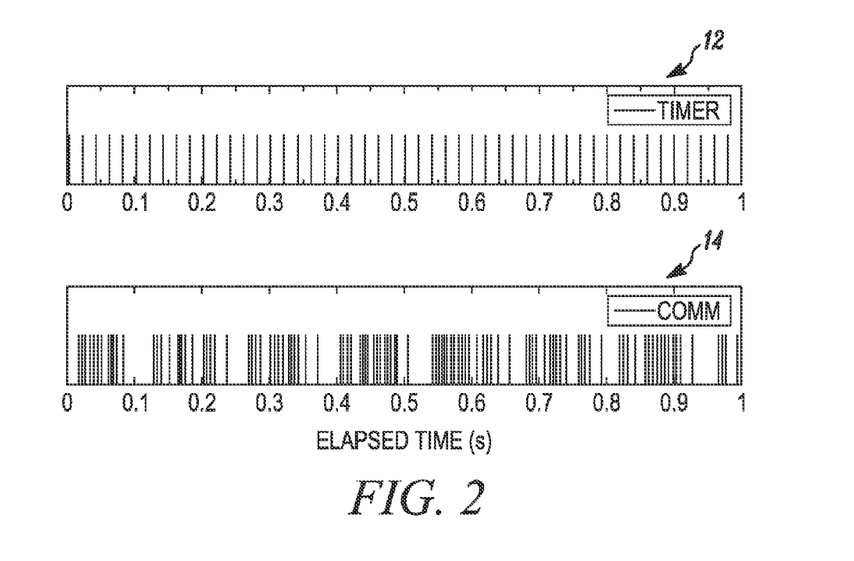
FIG. 2 is a plot of an example of deterministic and stochastic interrupts over time according to an embodiment.

Simply put, more predictable types of interrupts, such as timer and audio interrupts, may be designated as deterministic interrupts, whereas less predictable types of interrupts, such as graphic, sensor and communications interrupts, may be designated as stochastic interrupts. As will be discussed in greater detail, separating and isolating interrupt patterns into the deterministic and stochastic classes described herein can improve the probabilistic accuracy of idle duration predictions, and may ultimately reduce false sleep state decisions caused by stochastic interrupts. FIG. 2 shows a deterministic (e.g., timer subsystem) interrupt pattern 12 in comparison to a stochastic (e.g., communications subsystem) interrupt pattern 14.

Deterministic Interrupts

Figure 3:
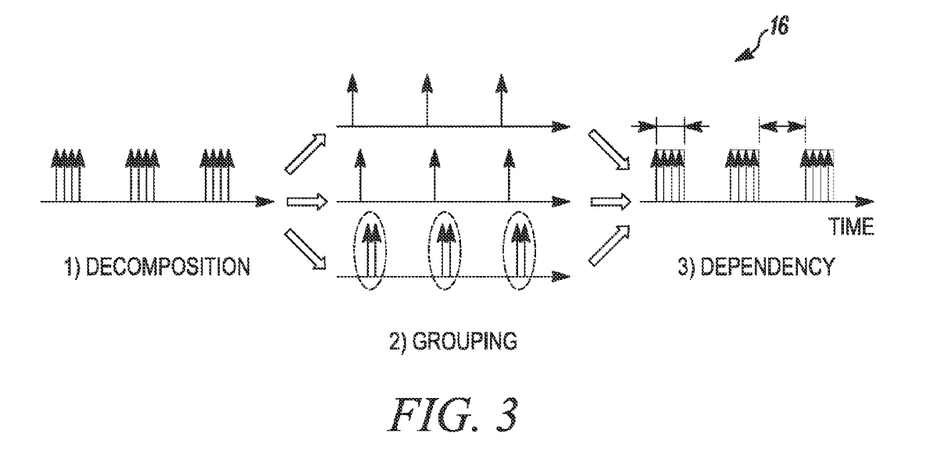
FIG. 3 is a block diagram of an example of a scheme of decomposing deterministic sources according to an embodiment.

FIG. 3 shows a scheme 16 of decomposing a composite source of interrupts in order to improve interrupt prediction accuracy. Generally, deterministic interrupts can be identified at design time (e.g., by consulting device specifications), at run-time via estimation, or any combination thereof. The three stages of the illustrated scheme 16 may be conducted as follows.

Decomposition: A platform may have multiple interrupt sources during active workloads, wherein the overall composition of interrupts can exhibit more random behavior than their individual contributing sources. Because such a phenomenon may make idle duration predictions difficult, stage one of the illustrated scheme 16 decomposes the multiple interrupt sources and considers their associated idle periods individually. Information pertaining to interrupt sources may be generally available in platform/system firmware as well as in OS device drivers.

Grouping: Certain interrupt sources may generate a burst of interrupts with very small inter-arrival times occurring within the burst. Stage two of the illustrated scheme 16 groups this known burst with a single system event, and introduces a "holding period". In particular, during the holding period, idle duration prediction may pause until the rest of the interrupt burst completes. Such an approach can save computation cycles related to estimation, and may in turn increase accuracy.

Dependency: In addition, some interrupts from different sources/devices may have timing dependencies on one another. Accordingly, stage three of the illustrated scheme 16 exploits such dependencies among interrupt sources to improve the prediction accuracy while minimizing overhead. For example, most slave device controller interrupts may be likely to be followed by an interrupt from the controlled device. Moreover, holding periods may be implemented in the dependency stage as well to further enhance prediction performance. Simply put, the scheme 16 can provide the basis of more accurate prediction of deterministic interrupts.

Figure 4:
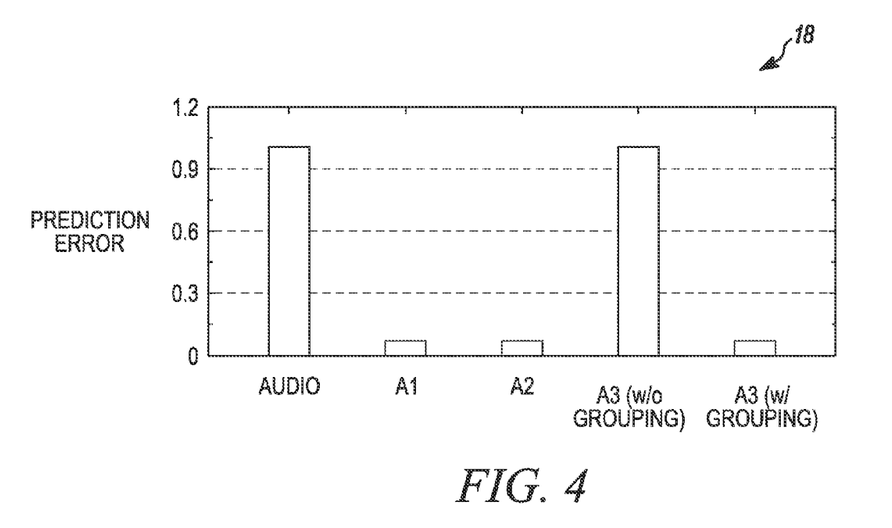
FIG. 4 is a chart of an example of prediction error for grouped and ungrouped deterministic sources according to an embodiment.

FIG. 4 demonstrates the advantages that may be associated with a composite interrupt source decomposition scheme as described herein. In particular, a chart 18 shows average interrupt interval prediction error for an audio subsystem, when a weighted moving average predictor is employed. For example, three audio subsystems, denoted by "A1", "A2", and "A3", share one interrupt, and by decomposing this composite interrupt to identify interrupt instances corresponding to these subsystems, we can improve the prediction accuracy. The first bar ("Audio") indicates the prediction error when the interrupts from three subsystems are considered as one composite source (i.e., similar to conventional Linux kernel idle governor solutions). The following three bars indicate the prediction error when the interrupts from different subsystems are considered separately. The illustrated results reveal that the prediction error significantly decreases by decomposing the interrupts, except for the interrupt A3. Accordingly, the underlying audio function tied to interrupt A3 may be bursty in nature. Applying the aforementioned grouping solution to interrupt A3, however, enables each burst to be considered as a single event. Accordingly, the prediction accuracy may improve to a level similar to the other interrupts, as demonstrated in the fifth bar.

Stochastic Interrupts

Unlike deterministic and pseudo-deterministic interrupts, stochastic interrupts may be more challenging to predict due to their inherent randomness. For interrupts that fall into the stochastic class, a probabilistic idle duration estimator may be deployed. In addition, an efficient approach to using the stochastic interrupt prediction may be deployed for processor and/or sleep state selection.

The interrupt arrivals from a stochastic source can be modeled by using an appropriate stochastic process, such as a Poisson process, where the probability of occurrence for at least one stochastic interrupt during the next time period $\tau$ can be estimated as $$P_{slc}(\tau) \approx 1 - e^{-\hat{\lambda}_{stc}\tau} \quad (1)$$

where $\hat{\lambda}_{stc}$ is the interrupt arrival rate, which can be estimated using an adaptive filter e.g., moving average filter) at run-time. This approach enables the prediction mechanism to evaluate the possibility of a stochastic interrupt arrival before the energy break-even time of the targeted sleep state, and use this information on state selection accordingly.

In most practical cases where idle period/duration prediction is deployed, it may be sufficient to accurately predict if the upcoming idle duration is longer than a certain threshold (i.e., instead of accurately predicting an absolute idle duration). This is due to the fact that the decision for a processor or platform to enter a sleep state may be based on the comparison of the predicted idle duration with the energy break-even time (EBT) of each sleep state.

In particular, a device might not be able to enter a sleep state if a projected idle period is shorter than the energy break-even time for the low power state in question. In this regard, there may be transition-related power consumption overhead as well as latency overhead that could offset the advantages associated with the reduced power consumption of a sleep state if the idle period is not long enough. Thus, the energy break-even time can generally indicate the amount of time the component would have to remain idle in order to justify transitioning to and from the low power state under consideration. Techniques described herein use a probability-based idle-duration prediction approach that considers the threshold-based nature of the sleep state selection process.

Idle Duration Predictions

First, the expected arrival time for the next deterministic interrupt can be calculated as the minimum of the arrival time for all deterministic interrupts considered $$\hat{t}_r = \min\{\hat{t}_1, \hat{t}_2, \ldots, \hat{t}_n\} \quad (2)$$

where $\hat{t}_k$, k=1, . . . , n is the expected time to arrival for the deterministic interrupt from source k.

Then, the probability of having an interrupt within the next $\tau$ time period, denoted as Prob($\tau$), can be calculated by considering the following two cases:

1. If $\tau$ is larger than the time to arrival for the nearest deterministic interrupt, then the probability is one:

If $\hat{t}_r < \tau$, then Prob($\tau$)=1

2. If $\tau$ is smaller than the time to arrival for the nearest deterministic interrupt, the probability is defined by the probability of the stochastic interrupt assuming a Poisson process is deemed appropriate for modeling If $\hat{t}_r > \tau$, then Prob($\tau$)=1−$e^{-\hat{\lambda}_{stc}\tau}$ The outlined probabilistic estimation technique can help transform the more challenging problem of precise idle duration estimation into a more relaxed sleep state selection problem. Finding a near-optimal solution to the latter may be more feasible, because of the differences in the potential of making an erroneous estimation. In the following subsection, a reward-based sleep state selection scheme is described that relies on the described probabilistic estimation approach.

Reward-Based Sleep State Selection

Due to the relatively high likelihood of making an erroneous idle time estimation using standard estimation techniques, a sleep state selection algorithm based on such estimation might perform sub-optimally. Therefore, a new decision metric (called "reward" herein) may be defined, wherein the reward decision metric incorporates the potential cost of false entry and missed opportunity in the sleep state decision, and uses the probabilistic estimation scheme described earlier to optimize the reward. In this context, reward may represent any measure of performance of particular interest to the system designer. For example, false entry or missed opportunity metrics can be proxies for potential loss in energy or throughput performance. In particular, when false entry of a sleep state occurs, the platform may consume more power compared to staying at the active state. Similarly, when a missed opportunity of entering a sleep state occurs, the platform may consume more power compared to entering the sleep state in question. Thus, the proposed reward-based sleep state selection scheme may be highly flexible compared to the conventional threshold-based sleep state selection, which relies solely on idle duration prediction. Once the reward metric is defined, the selection process may chose an optimal sleep state (iOPT) that maximizes the expected reward.

Figure 5:
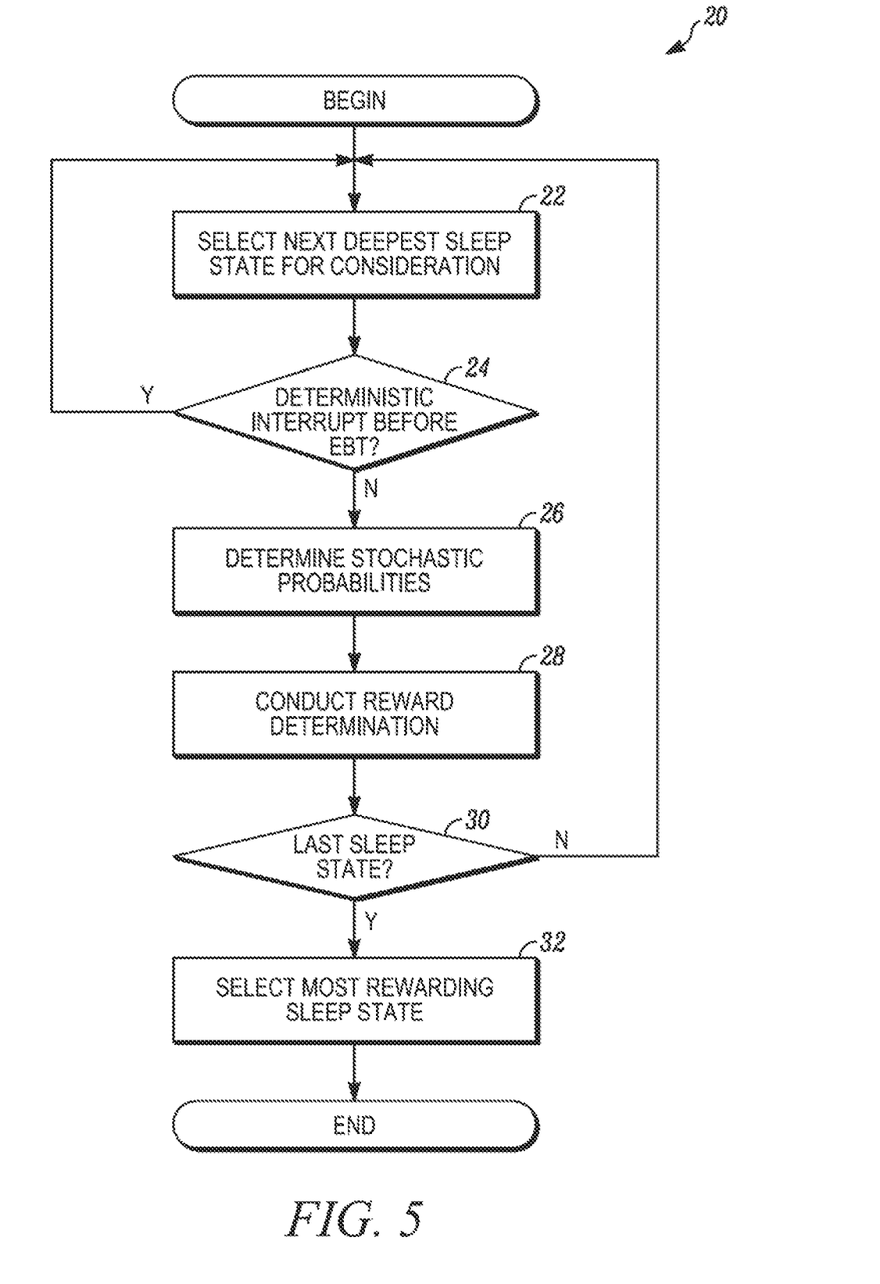
FIG. 5 is a flowchart of an example of a method of selecting sleep states according to an embodiment.

In particular, FIG. 5 shows a method 20 of selecting sleep states for a platform, processor, etc. The method 20 may be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 22 provides for selecting the next deepest sleep state for consideration. A determination may be made at block 24 as to whether a deterministic interrupt is expected to occur before the energy break even time for the sleep state under consideration. Thus, block 24 may involve determining the idle period for one or more deterministic interrupts, and determining the EBT for the sleep state currently under consideration. If the EBT exceeds the idle period (e.g., a deterministic interrupt is expected before the EBT), the illustrated process returns to block 22 and effectively bypasses the reward determination for the sleep state in question.

If no deterministic interrupts are expected before the EBT, block 26 may make one or more stochastic probability determinations. In particular, block 26 can involve determining a false entry probability ($Prob_{FE}$) and a missed opportunity probability ($Prob_{MO}$). For example, the false entry probability and missed opportunity probability may be calculated for a state "i" as:

$$Prob_{FE}(i) = 1 - \exp(-lambda * EBT(i)) \quad (3)$$

$$Prob_{MO}(i) = \exp(-lambda * EBT(i+1)) \quad (4)$$

where lambda is the estimated stochastic interrupt arrival rate, $Prob_{FE}(i)$ is the percent probability that a stochastic interrupt occurs before the EBT, and $Prob_{MO}(i)$ is the percent probability that a stochastic interrupt occurs after the EBT of the next deeper sleep state.

Moreover, block 28 may conduct a reward determination for the sleep state under consideration based on the stochastic probabilities. An example of a reward determination is:

$$Reward(i) = Prob_{FE}(i) * Pen_{FE}(i) + Prob_{MO}(i) * Pen_{MO}(i) + (1 - Prob_{FE}(i) - Prob_{MO}(i)) * Gain(i) \quad (5)$$

where $Pen_{FE}(i)$ and $Pen_{FE}(i)$ are the penalties associated with a false entry and a missed opportunity, respectively, and Gain(i) is the expected gain from entering state i without the occurrence of a false entry or a missed opportunity (e.g., correct state).

Illustrated block 30 determines whether the deepest sleep state (e.g., state "n") has been reached. If so, the most rewarding sleep state may be selected at block 32. In particular, block 32 may involve selecting the sleep state that has the highest reward metric.

Figure 6:
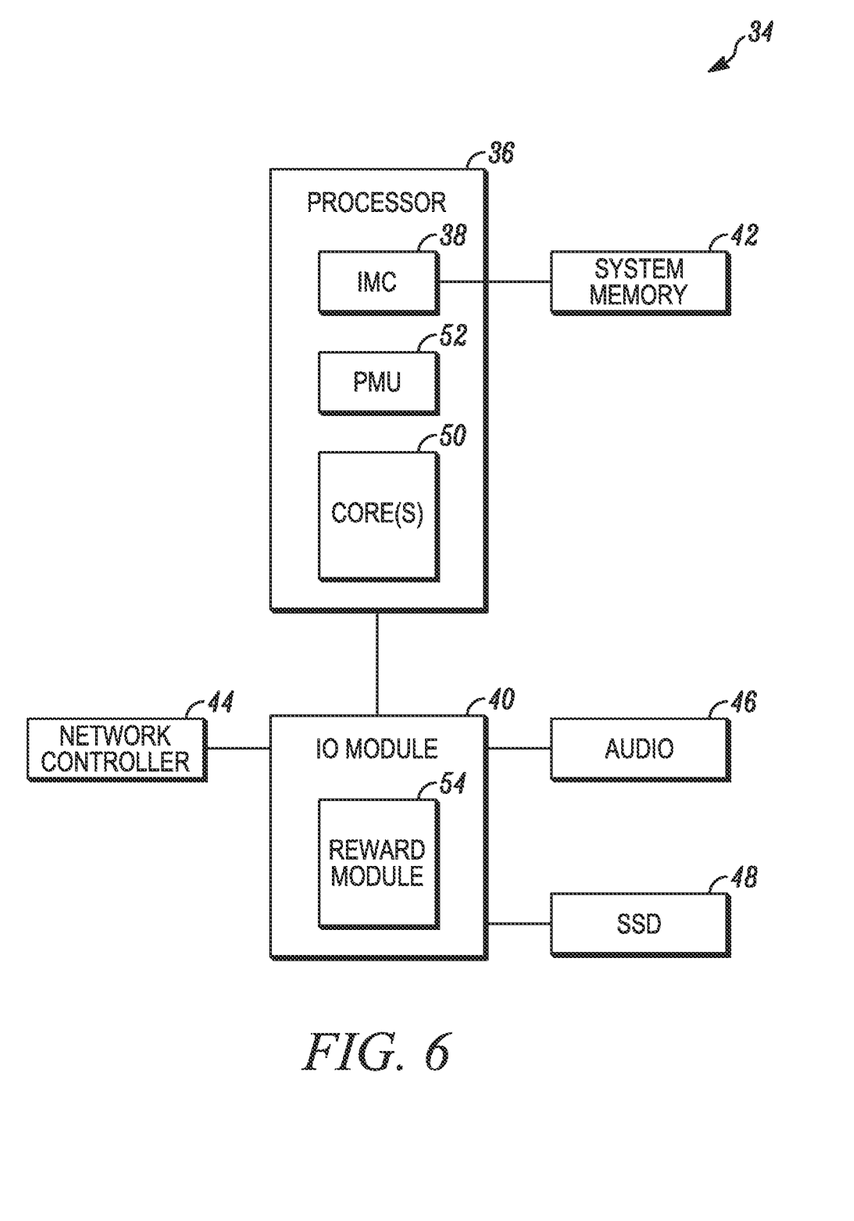
FIG. 6 is a block diagram of an example of a computing platform according to an embodiment.

Turning now to FIG. 6, a platform 34 is shown. The platform 34 may be part of a mobile device having computing functionality (e.g., personal digital assistant/PDA, laptop, smart tablet), communications functionality (e.g., wireless smart phone), imaging functionality, media playing functionality (e.g., smart television/TV), or any combination thereof (e.g., mobile Internet device/MID). In the illustrated example, the platform 34 includes a processor 36, an integrated memory controller (IMC) 38, an IO module 40, system memory 42, a network controller (e.g., network interface card) 44, an audio IO device 46 and a solid state disk (SSD) 48. The processor 36, which may include a core region with one or several processor cores 50, may use a power management unit (PMU) 52 to place its cores 50 and other platform components into one or more active and/or sleep states based on performance and/or power management concerns, as already noted.

The illustrated IO module 40, sometimes referred to as a Southbridge or South Complex of a chipset, functions as a host controller and communicates with the network controller 44, which could provide off-platform communication functionality for a wide variety of purposes such as, for example, cellular telephone W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RE) telephony purposes. The IO module 40 may also include one or more wireless hardware circuit blocks to support such functionality.

The SSD 48 may include one or more NAND chips and might be used to provide high capacity data storage and/or a significant amount of parallelism. There may also be solutions that include NAND controllers implemented as separate ASIC controllers being connected to the IO module 40 on standard buses such as a Serial ATA (SATA, e.g., SATA Rev. 3.0 Specification, May 27, 2009, SATA International Organization/SATA-IO) bus, or a PCI Express Graphics (PEG, e.g., Peripheral Components Interconnect/PCI Express x16 Graphics 150W-ATX Specification 1.0, PCI Special Interest Group) bus. The SSD 48 could also be used as a USB (Universal Serial Bus, e.g., USB Specification 3.0, USB Implementers Forum) flash storage device.

The illustrated IO module 40 includes a reward module 54 having logic configured to conduct a reward determination for a plurality of sleep states to obtain a plurality of reward determinations with respect to the platform 34. The logic of the reward module 54 may also select a sleep state for the system from the plurality of sleep states based at least in part on the plurality of reward determinations, wherein the PMU 52 of the processor 36 may place the platform 34 in the selected sleep state. In addition, the reward module 54 may distinguish one or more deterministic interrupts from one or more stochastic interrupts in making the reward determinations, wherein devices such as the network controller 44, audio IO device 46, and/or SSD 48 may be interrupt sources. The reward module 54 may be implemented elsewhere in the platform 34 such as, for example, on the processor 36.

Thus, techniques described herein may capture the characteristics of deterministic interrupts (e.g., timer, audio), and exploit related information available in the system to improve interrupt prediction accuracy. Moreover, the sleep state selection process described herein can make platforms more energy efficient by enabling the platform to make better decisions. In addition, techniques described herein can enable platforms to scale their power consumption based on workload, even when the workloads are very active and have relatively short idle durations. Additionally, idle duration predictions may provide greater flexibility in designing solutions for system performance optimization.

Embodiments may therefore provide for a system having a controller with logic to conduct a reward determination for a plurality of sleep states to obtain a plurality of reward determinations with respect to the system. The logic may also select a sleep state from the system from the plurality of sleep states based at least in part on the reward determinations. In addition, the system may have a processor with a power management unit to place the system in the selected sleep state.

Embodiments may also include a non-transitory computer readable storage medium having a set of instructions which, if executed by a processor, cause a computer to conduct a reward determination for a plurality of sleep states to obtain a plurality of reward determinations with respect to a device.

The instructions can also cause a computer to select a sleep state for the device from the plurality of sleep states based at least in part on the plurality of reward determinations.

Additionally, embodiments can include an apparatus having logic to conduct a reward determination for a plurality of sleep states to obtain a plurality of reward determinations with respect to a device. The logic may also select a sleep state for the device from the plurality of sleep states based at least in part on the plurality of reward determinations.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system comprising:
a controller having logic to,
determine a false entry probability;
conduct a reward determination for a plurality of sleep states to obtain a plurality of reward determinations with respect to the system; and
select a sleep state for the system from the plurality of sleep states based at least in part on the plurality of reward determinations; and
a power management unit to place the system in the selected sleep state,
wherein the false entry probability is a percentage probability that one or more stochastic interrupts will occur before an energy break-even time associated with a sleep state, and is based at least in part on an estimated stochastic interrupt arrival rate.

2. The system of claim 1, wherein the logic is to,
determine a missed opportunity probability, wherein the reward determination is based at least in part on the false entry probability and the missed opportunity probability.

3. The system of claim 2, wherein the missed opportunity probability is a probability that all probabilistic interrupts will occur after the energy break even time associated with the sleep state.

4. The system of claim 2, wherein the logic is to use a stochastic process to determine the false entry probability and the missed opportunity probability.

5. The system of claim 1, wherein the logic is to,
determine a false entry penalty, and
determine a missed opportunity penalty, wherein the reward determination is based at least in part on the false entry penalty and the missed opportunity penalty.

6. The system of claim 1, wherein the logic is to determine a correct state gain, wherein the reward determination is based at least in part on the correct state gain.

7. The system of claim 1, wherein the logic is to,
distinguish one or more deterministic interrupts from one or more stochastic interrupts,
determine an idle period with respect to at least one of the one or more deterministic interrupts,
determine the energy break even time for the sleep state, and
bypass the reward determination if the energy break even time exceeds the idle period.

8. The system of claim 7, wherein the logic is to identify a plurality of deterministic interrupt sources, wherein the idle period is to be determined for two or more interrupt sources individually.

9. The system of claim 8, wherein the logic is to,
group two or more of the plurality of deterministic sources together for consideration, and
identify one or more dependencies associated with the grouped two or more of the plurality of deterministic sources.

10. A non-transitory computer readable storage medium comprising a set of instructions which, if executed by a controller, cause a computer to:

determine a false entry probability;

conduct a reward determination for a plurality of sleep states to obtain a plurality of reward determinations with respect to a device; and select a sleep state for the device from the plurality of sleep states based at least in part on the plurality of reward determinations, wherein the false entry probability is a percentage probability that one or more stochastic interrupts will occur before an energy break-even time associated with a sleep state, and is based at least in part on an estimated stochastic interrupt arrival rate.

11. The medium of claim 10, wherein the instructions, if executed, cause a computer to:

determine a missed opportunity probability, wherein the reward determination is conducted based at least in part on the false entry probability and the missed opportunity probability.

12. The medium of claim 11, wherein the missed opportunity probability is a probability that all probabilistic interrupts will occur after the energy break even time associated with the sleep state.

13. The medium of claim 11, wherein the instructions, if executed, cause a computer to use a stochastic process to determine the false entry probability and the missed opportunity probability.

14. The medium of claim 10, wherein the instructions, if executed, cause a computer to:

determine a false entry penalty; and determine a missed opportunity penalty, wherein the reward determination is based at least in part on the false entry penalty and the missed opportunity penalty.

15. The medium of claim 10, wherein the instructions, if executed, cause a computer to determine a correct state gain, wherein the reward determination is based at least in part on the correct state gain.

16. The medium of claim 10, wherein the instructions, if executed, cause a computer to:

distinguish one or more deterministic interrupts from one or more stochastic interrupts;

determine an idle period with respect to at least one of the one or more deterministic interrupts;

determine the energy break even time for the sleep state; and bypass the reward determination if the energy break even time exceeds the idle period.

17. The medium of claim 16, wherein the instructions, if executed, cause a computer to identify a plurality of deterministic interrupt sources, wherein the idle period is to be determined for two or more interrupt sources individually.

18. The medium of claim 17, wherein the instructions, if executed, cause a computer to:

group two or more of the plurality of deterministic sources together for consideration; and identify one or more dependencies associated with the grouped two or more of the plurality of deterministic sources.

19. An apparatus comprising:

logic to, determine a false entry probability;

conduct a reward determination for a plurality of sleep states to obtain a plurality of reward determinations with respect to a device; and select a sleep state for the device from the plurality of sleep states based at least in part on the plurality of reward determinations, wherein the false entry probability is a percentage probability that one or more stochastic interrupts will occur before an energy break-even time associated with a sleep state, and is based at least in part on an estimated stochastic interrupt arrival rate.

20. The apparatus of claim 19, wherein the logic is to, determine a missed opportunity probability, wherein the reward determination is conducted based at least in part on the false entry probability and the missed opportunity probability.

21. The apparatus of claim 20, wherein the missed opportunity probability is a probability that all probabilistic interrupts will occur after the energy break even time associated with the sleep state.

22. The apparatus of claim 20, wherein the logic is to use a stochastic process to determine the false entry probability and the missed opportunity probability.

23. The apparatus of claim 19, wherein the logic is to, determine a false entry penalty, and determine a missed opportunity penalty, wherein the reward determination is based at least in part on the false entry penalty and the missed opportunity penalty.

24. The apparatus of claim 19, wherein the logic is to determine a correct state gain, wherein the reward determination is based at least in part on the correct state gain.

25. The apparatus of claim 19, wherein the logic is to, distinguish one or more deterministic interrupts from one or more stochastic interrupts, determine an idle period with respect to at least one of the one or more deterministic interrupts, determine the energy break even time for the sleep state, and bypass the reward determination if the energy break even time exceeds the idle period.

26. The apparatus of claim 25, wherein the logic is to identify a plurality of deterministic interrupt sources, wherein the idle period is to be determined for two or more interrupt sources individually.

27. The apparatus of claim 26, wherein the logic is to, group two or more of the plurality of deterministic sources together for consideration, and identify one or more dependencies associated with the grouped two or more of the plurality of deterministic sources.

* * * * *